Figure 4A:
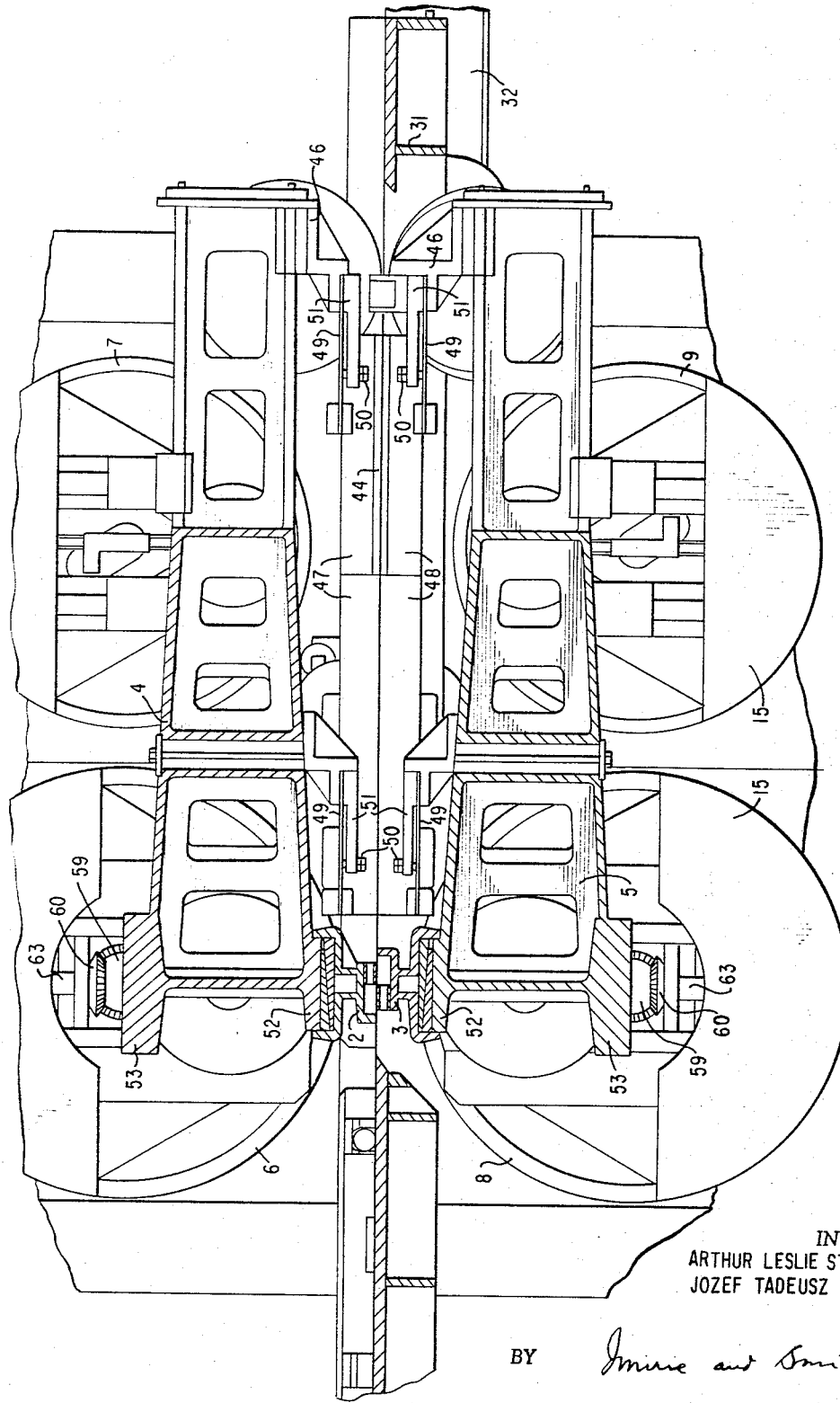

Aug. 1, 1967  A. L. STUCHBERY ET AL  3,333,495
APPARATUS FOR PROCESSING STRIP OR SHEET MATERIAL
Filed July 2, 1965  9 Sheets-Sheet 1
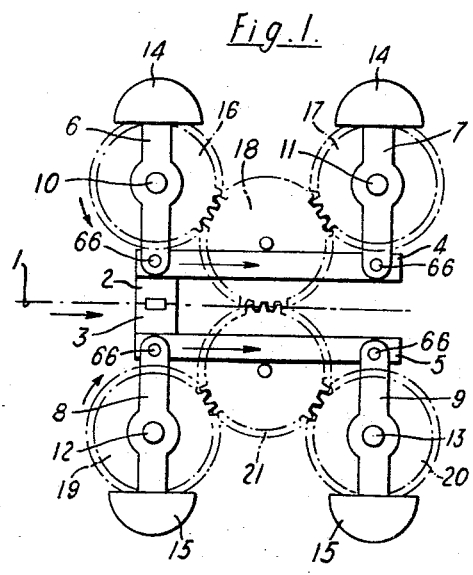
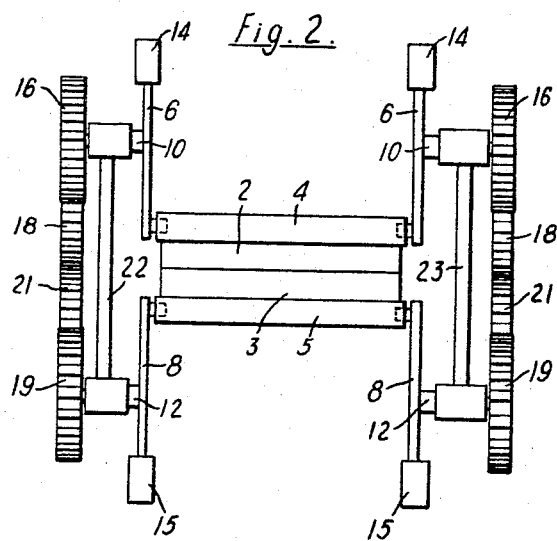
ARTHUR L. STUCHBERY
JOZEF T. FRANEK
Inventors
By *Imrie & Smiley*
Attorneys

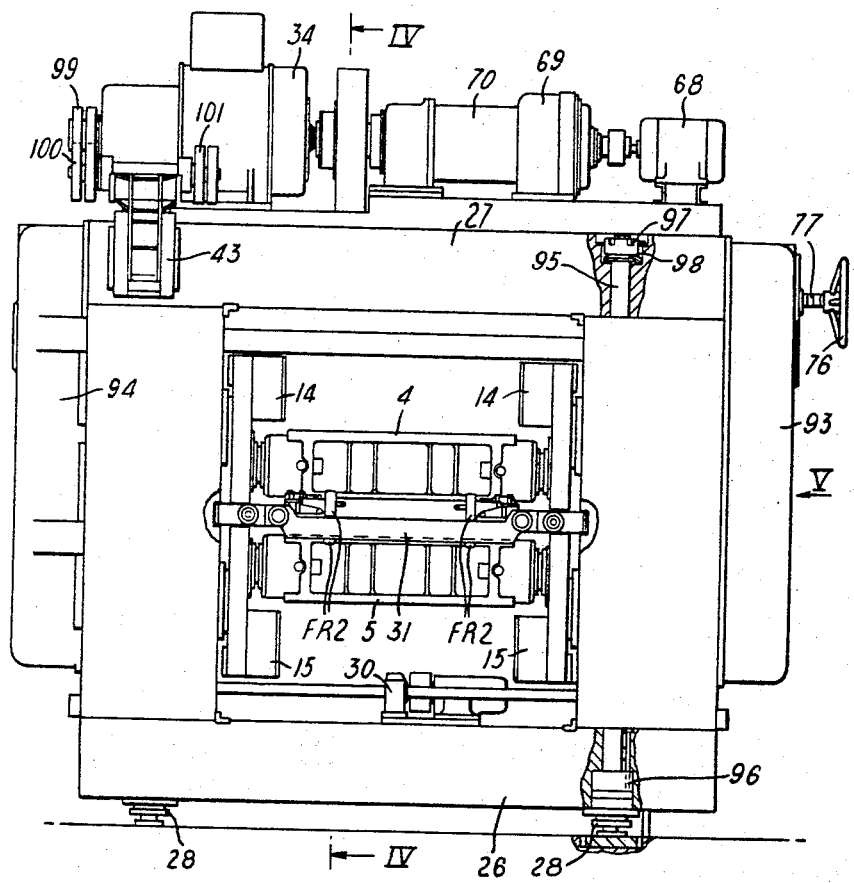

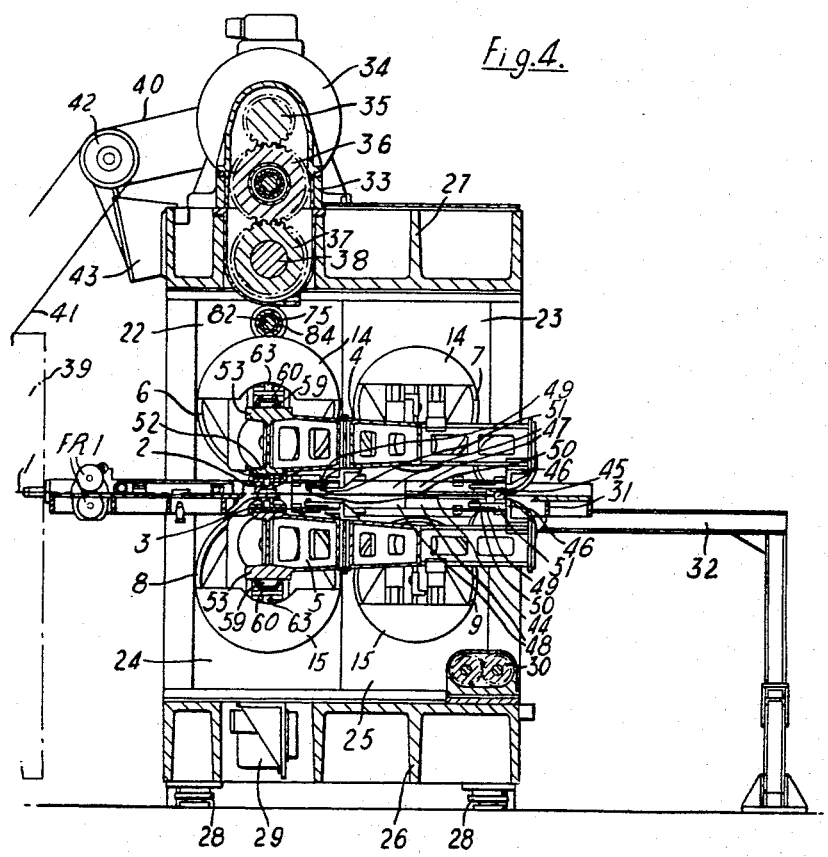

Inventors
ARTHUR L. STUCHBERY
JOZEF T. FRANEK

By *Imirie & Smiley*
Attorneys

Inventors
ARTHUR L. STUCHBERY
JOZEF T. FRANEK

United States Patent Office 3,333,495
Patented Aug. 1, 1967

---

3,333,495
APPARATUS FOR PROCESSING STRIP OR SHEET MATERIAL
Arthur Leslie Stuchbery, Enfield, and Jozef Tadeusz Franek, London, England, assignors to The Metal Box Company Limited, London, England, a British company
Filed July 2, 1965, Ser. No. 469,266
Claims priority, application Great Britain, July 28, 1964, 29,997/64
29 Claims. (Cl. 83—135)

This invention relates to apparatus for processing metallic strip or non-metallic strip and sheet material, for example by stamping, embossing, drawing, scoring, partially scoring and cutting, or cutting, during movement of the material at a predetermined linear velocity.

According to the invention there is provided apparatus for processing material being advanced along a predetermined path at a predetermined linear velocity, comprising first and second tool-carrying frames respectively supporting first and second processing tools for co-operation one with the other and for movement into and out of engagement with opposite sides of material passing therebetween, pairs of intergeared adjustable throw cranks connected one pair to each end of each tool-carrying frame with the cranks of each pair mounted on opposite sides of a frame, driving means co-operating with each of the cranks and operable to rotate the pairs of cranks for the first and second frames in contra directions to maintain the processing tools in parallel relation throughout the movements of the tools into and out of co-operation with each other, and means operable to adjust the throw of said cranks so that the tools move at substantially the linear speed of the material and in the direction of movement thereof during processing of the material by the tools. The crank shafts of the cranks on each side of the frames are rotated by trains of gears individual thereto, each of said gear trains comprising driven gears rotatable with the crank shafts, a pair of idler gears meshing one with the other and respectively meshing one with the driven gears for the first frame and one with the driven gears for the second frame, and driving gears each meshing with one driven gear for one of the frames.

The crank pins of the cranks may be adjustable relative to the crank shafts to vary the radial distance between the axes of the crank pins and the axes of the crank shafts, each said crank shaft being a hollow shaft and the crank pin therefor including a nut screwed on to an adjusting screw the axis of which is at right angles to the axis of the crank shaft and which has rotatable therewith a bevel gear meshing with a second bevel gear carried by an adjustment shaft co-axial with and located in the hollow crank shaft, said adjustment shaft being rotatable by manually operable adjusting mechanism co-operating therewith. The apparatus may include gauge pieces locatable relative to the crank pins to determine the extent of movement of the crank pins away from the axes of the crank shafts.

The adjustment shafts for the cranks of one pair for one frame have adjusting gears rotatable therewith and idler gears connect the adjusting gears with adjusting gears rotatable with the adjusting shafts for the cranks of one pair for the other of the frames. The manually operable adjusting mechanism may comprise a rotatable adjusting member, eccentric differential gears rotatable with said member, and at one side of the frames an intermediate gear and a locking gear rotatable by the eccentric differential gears and co-operating respectively with one of the driving gears and with a transfer gear co-axial and rotatable with a primary adjusting gear co-operating with one of said adjusting gears. The driving gears are preferably rotatable with an idler tubular shaft and the transfer gear is rotatable with a torsion shaft co-axial with and extending through a hollow shaft extending axially through the tubular shaft, said hollow shaft being rotatable with the driving gears and pinned to the torsion shaft at a position central between the ends thereof. The driving gears may be normally rotated by primary gears driven by a prime mover and a clutch be operable to couple said one driving gear to the transfer gear.

The frames may be balanced by weights so disposed that the centres of gravity thereof and the axes of the crank pins are on opposite sides of the axes of the crank shafts and are equi-distant therefrom. Each frame is preferably of lattice construction and the centre of gravity of the frame assembly is located on a straight line passing through the axes of the crank pins.

The apparatus may include a stop rigidly mounted on one of the frames at a position downstream of the tool carried thereby, said stop being interposable by the frame in the path of the leading edge of the material to be processed thereby accurately to locate the material relatively to the tools and to be movable by the frame out of the path of the material as the tools are disengaged therefrom. The apparatus may also include clamps resiliently mounted on the frames for movement therewith, said clamps being located between the tools and said stop and operable to prevent rippling of the material between the tools and the stop.

Further the apparatus may include tapered pillars carried by one of the frames, and internally tapered sleeves carried by the other of the frames, said pillars and sleeves being opposed one with another and arranged to effect accurate location of the frames one with the other.

Figure 5:
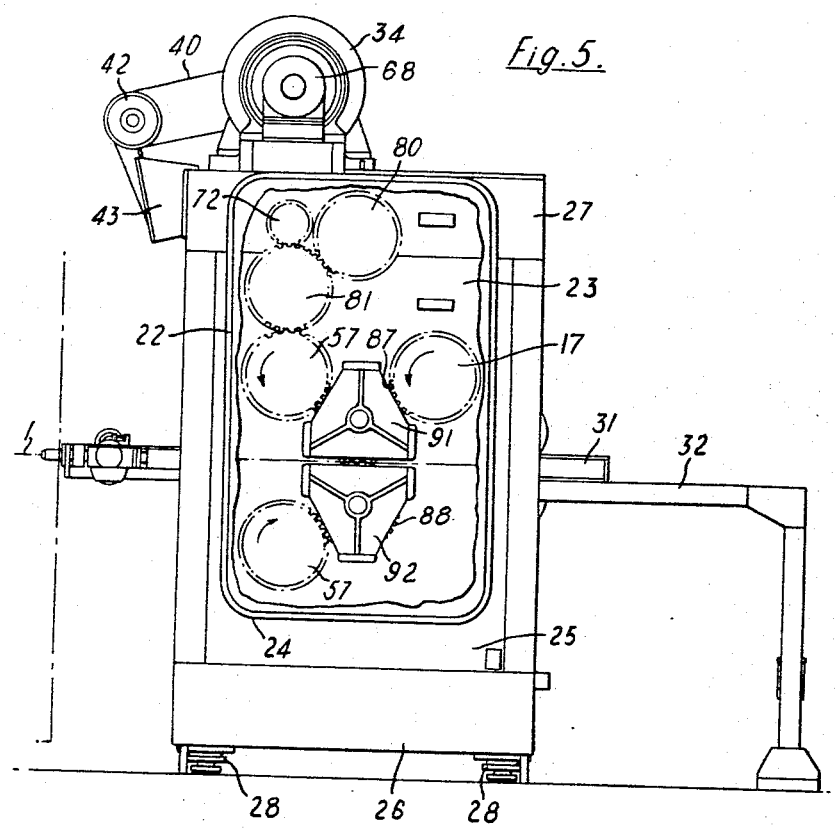
Figure 6:
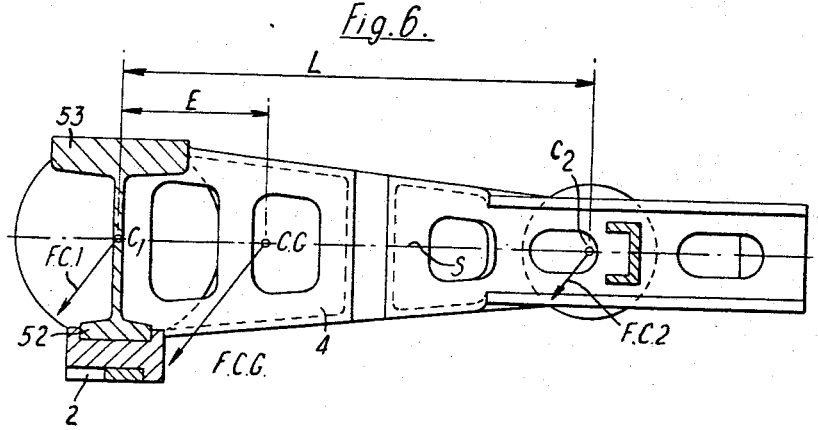
Figure 7:
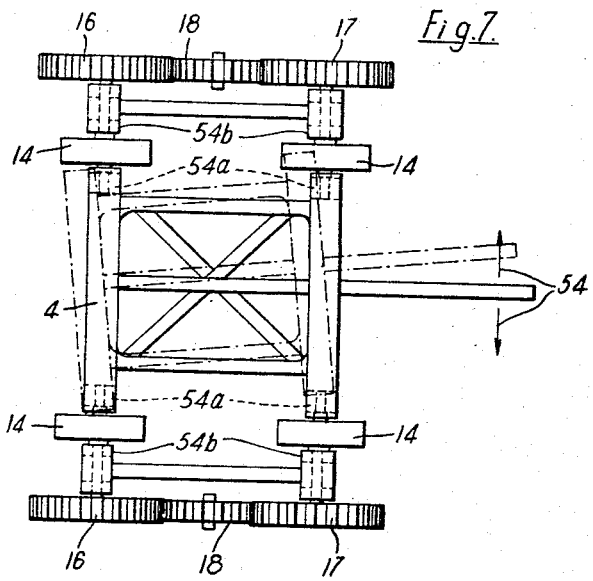
Figures 8, 9:
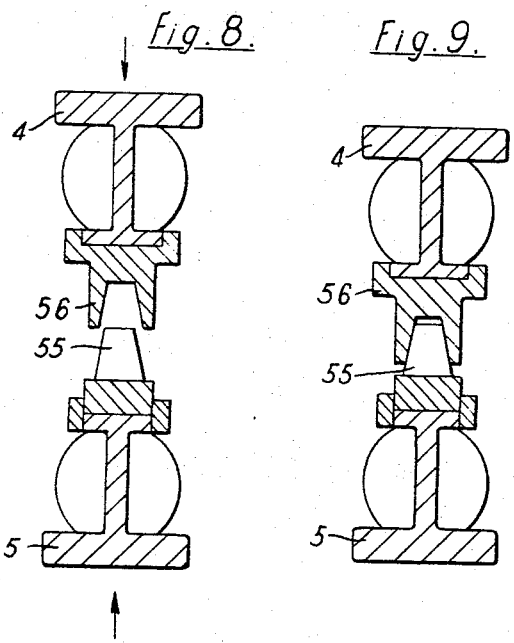
Figure 10:
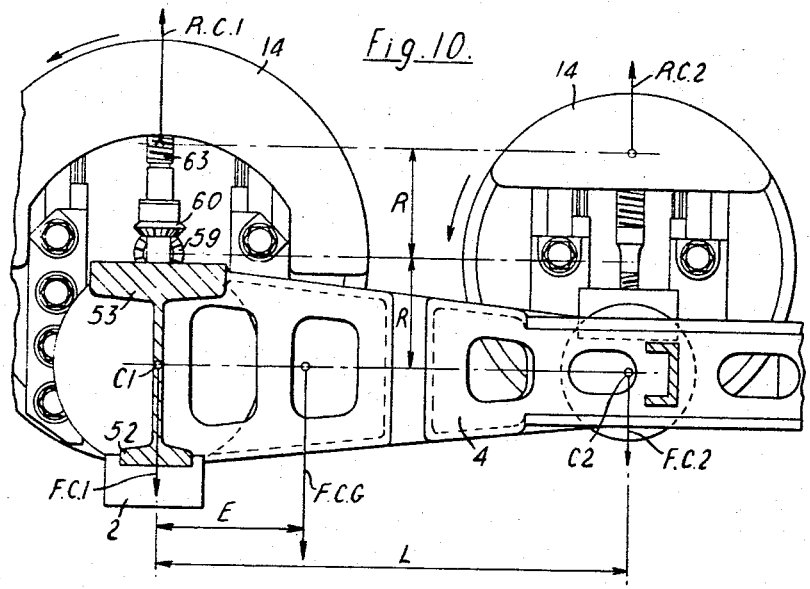
Figure 11:
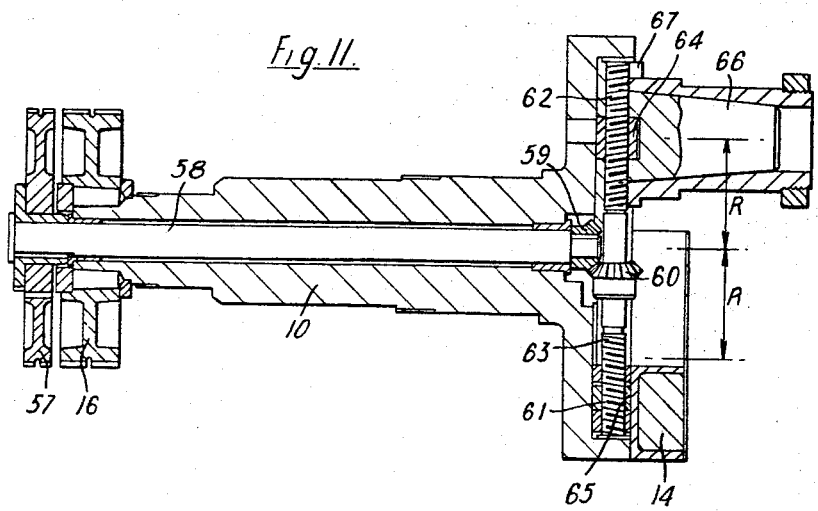
Figure 12:
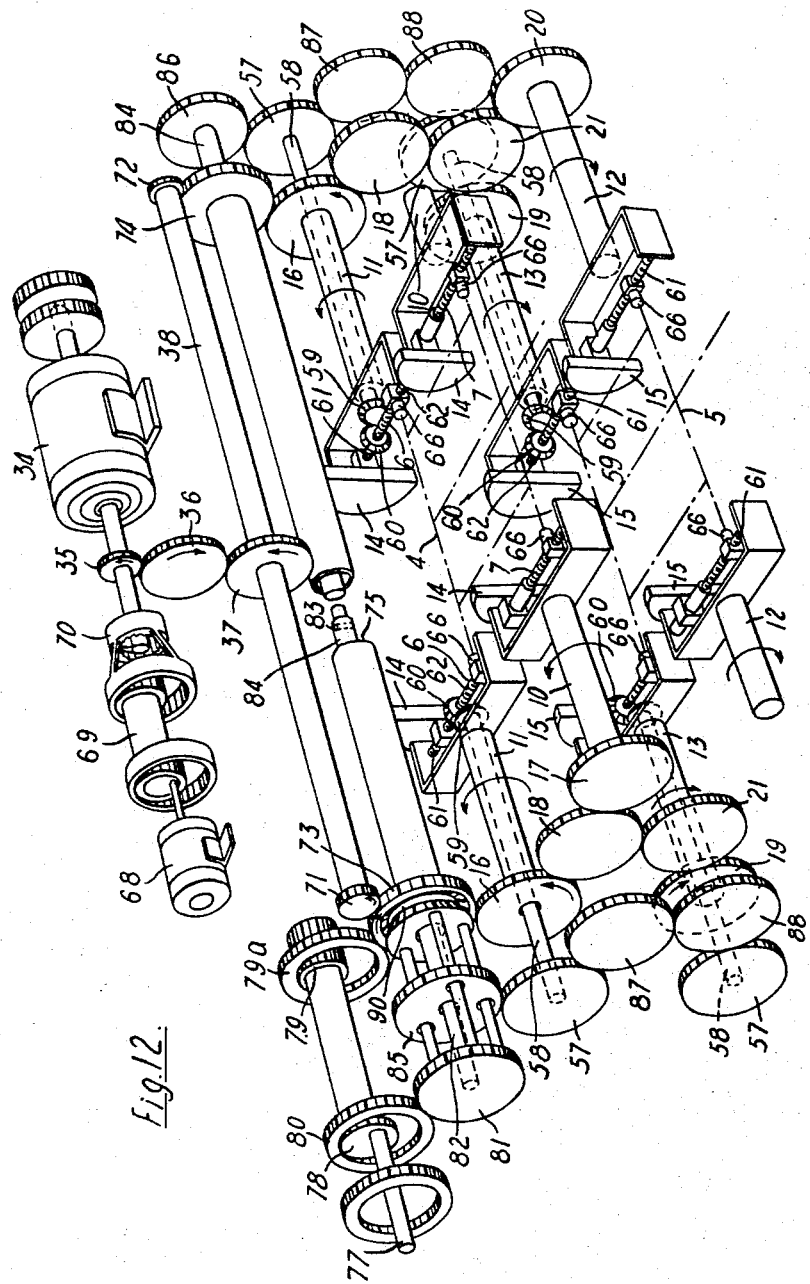
Figure 13:
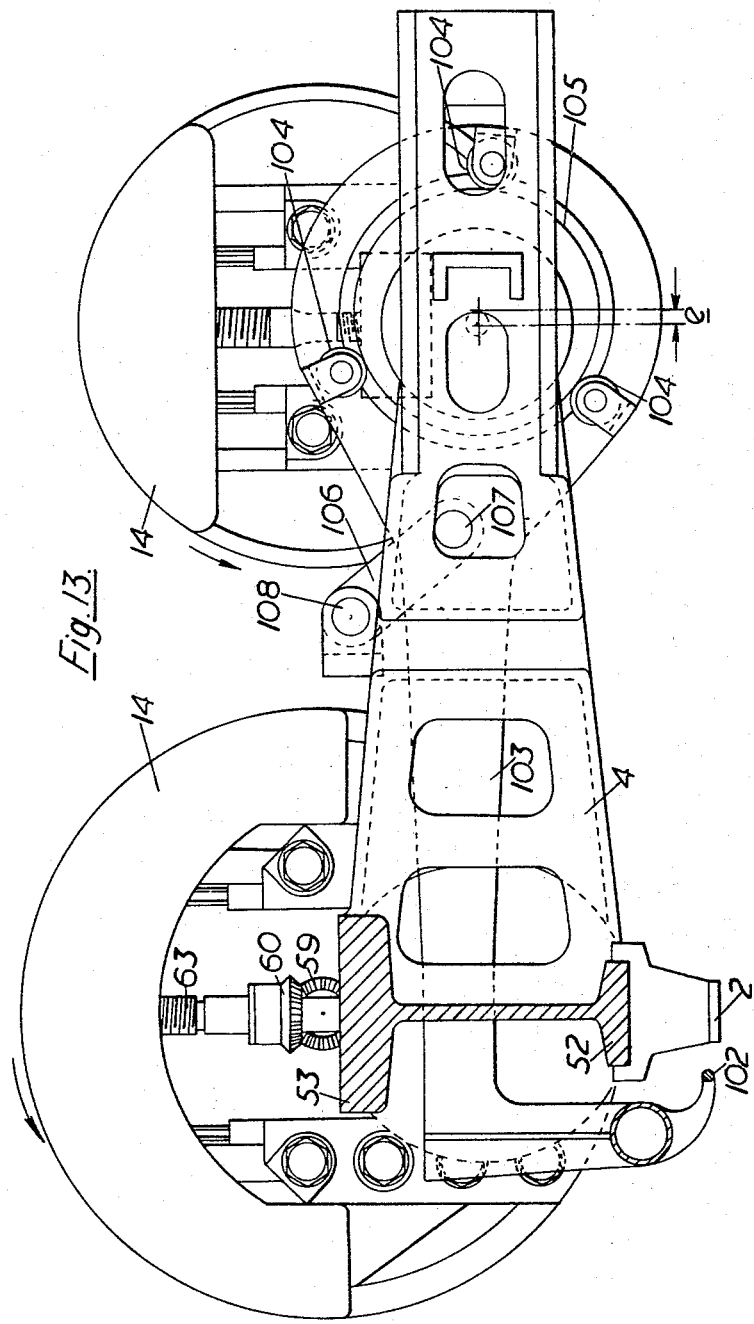

In order that the invention may be clearly understood one embodiment thereof will now be described, by way of example, with reference to the accompanying drawings, in which:

FIGURE 1 is a diagrammatic side elevation illustrating the principles of operation of apparatus according to the invention, FIGURE 2 is an end elevation of FIGURE 1, FIGURE 3 is an end elevation of apparatus according to the invention, FIGURE 4 is a section on line IV—IV, FIGURE 3, FIGURE 4a is an enlarged section showing a portion of the assembly illustrated in FIGURE 4, FIGURE 5 is an end view of FIGURE 3 looking in the direction of arrow V, FIGURE 6 is a longitudinal section through a tool-carrying frame embodied in the apparatus, FIGURE 7 is a diagrammatic plan of FIGURE 1, FIGURES 8 and 9 are sections illustrating the mode of operation of a detail of the apparatus, FIGURE 10 illustrates the dynamic balancing of one of the tool-carrying frame assemblies, FIGURE 11 is a longitudinal section through one of the cranks by which the tool-carrying frames are supported, FIGURE 12 is a pictorial view illustrating the driving and adjusting mechanism for the apparatus, and FIGURE 13 is a view similar to FIGURE 10 but shows a modification thereto.

Referring to FIGURES 1 and 2, these drawings diagrammatically illustrate the basic elements of processing apparatus according to the invention. Material 1, FIGURE 1, to be processed is advanced, by any suitable means, not shown, along a predetermined path at constant predetermined linear speed. The material to be processed may be of any desired kind, for example it may be metallic or nonmetallic. The apparatus for processing the material comprises first and second processing tools 2, 3 disposed for movement into and out of engagement with opposite sides of the material 1 and the tools may be cutting, stamping, scoring, drawing, or embossing tools. The tools 2, 3 are supported respectively for co-operation one with the other by first and second tool-carrying frames 4, 5 which are mounted respectively on pairs 6, 7 and 8, 9 of crank arms. The crank arms are rotatable with crank shafts 10, 11; 12, 13 and the arms 6, 7 and 8, 9 are contra-rotatable to maintain the tools, 2, 3 in parallel relation throughout the movements of the tools nito and out of co-operation with each other and to move the tools at substantially the linear speed of the material 1 and in the direction of movements of the material during processing of the material by the tools 2, 3.

The weights of the tool-carrying frames 4, 5 are balanced respectively by balance weights 14, 15 and the crank shafts 10, 11 are driven by driven gears 16, 17 which each mesh with an idler gear 18 to take the frame 4 through the dead centres. Crank shafts 12, 13 are driven by driving gears 19, 20 which each mesh with an idler gear 21 to take the frame 5 through the dead centres. The idler gears 18 and 21 mesh one with the other to keep the frames 4, 5 in the correct relationship thereof.

The angular velocity of the parts performing the rotary motion is constant throughout each cycle during normal constant output speed of operation and all of the rotary parts are balanced so that the sums of their inertia forces and moments are equal to zero either within the parts themselves or within the kinetic systems 6, 7 and 8, 9 at any angular position of the cranks during each cycle. The arrangement of the apparatus is also such that during processing of the material by the tools 2, 3 the tool-carrying frames 4, 5 are in stable condition and not in their dead centres, and are parallel to the material being processed. It will also be understood that the period of processing of the material is effected in the shortest possible time during which the velocity of the tools 2, 3 in the direction of movement of the material 1 is practically constant.

Referring now to FIGURES 3 to 5 which illustrate apparatus embodying the principles described above with reference to FIGURES 1 and 2, the tool-carrying frames 4, 5 are shown in the positions thereof in which they are closest together and the tools 2, 3 are fully engaged and sheet material 1 is fed to the apparatus at a constant predetermined linear speed by feed rollers FR1, FIGURE 4. Further feed rollers FR2, FIGURE 3, draw the material away from the apparatus. The crank shafts 10, 11 are supported by bearing blocks 22, 23, FIGURES 4 and 5 and the crank shafts 12, 13 are supported by bearing blocks 24, 25. The bearing blocks are rigidly clamped in position by bolts, not shown, to a base casting 26 and a top casting 27. The base 26 is supported by four differential type levelling screws 28 and carries an oil scavenge pump 29, FIGURE 4, and a material control table extracting arrangement 30, the material control table 31 being supported for sliding movement along guide elements 32 by the extracting arrangement. The mode of operation of the extracting arrangement forms no part of the present invention and is not described herein.

The top casting 27 supports a base plate 33, FIGURE 4, on which is mounted a prime mover shown as an electric motor 34 which drives a gear 35 which, in turn, transfers the drive through an idler gear 36 to a gear 37 keyed to a shaft 38. The motor 34 also provides the drive for the material feeder 39, FIGURE 4, through a toothed belt 40, a belt 41 and a layshaft assembly 42 which is carried in bearings by bracket 43 which is secured to the top casting 27.

When the tools 2, 3 consist of a punch and die for cutting the material into lengths the precise length of sheet 44, FIGURES 4 and 4a, to be cut off is determined by a stop 45 which is rigidly mounted on the frame 5 by a bracket 46. To avoid rippling of the strip between the stop 45 and the die 3 the strip is clamped between co-operating clamp bars 47, 48 before the strip is contacted by the punch 2 and die 3. The clamp bars are each carried by leaf springs 49 which, by adjustment of screws 50, are pre-loaded against brackets 51 to permit the required clamping action with minimum deflection. The brackets 51 are mounted on the tool-carrying frames 4, 5.

The construction of the tool-carrying frames 4, 5 is identical and FIGURE 6 is a longitudinal section through the frame 4 and illustrates the static balancing thereof. The frame is of a lattice construction designed for maximum rigidity without loss of lightness of weight and desired distribution of metal to result in positioning of the centre of gravity of the whole assembly to be on a straight line S drawn through the crank pin bearing axes C1, C2. These features ensure that there are no turning moments which cannot be balanced acting on the frames. It accordingly follows that at any position of the frame the total centrifugal force FCG can be superimposed by two forces FC1 and FC2 acting on the crank pins C1, C2 and parallel to the total force FCG. This feature is achieived by so designing the frame that the combined moment of mass for the tool 2 and the frame web 52 is balanced by the upper web 53 of the frame. The ratio of the distance between CG and C1, that is distance E, relative to the distance L between the axes C1, C2 of the crank pins influences the numerical value of forces acting on the crank pins.

FIGURE 7 is a top plan of FIGURE 1 and illustrates the stability of the frame 4 during cutting. If during cutting one side of the die 2, FIG. 1, had a tendency to lag behind the frame 4 would have to skew, as indicated in broken lines, but movement of the frame in the direction of arrows 54 cannot occur because it is prevented by thrust pre-loaded bearings 54a in the frame and 54b on the crank shafts 12, 13 which act on the frame before the driving gears can be caused to resist the tendency to skew. Both frames 4, 5 are similarly rendered stable and the condition of stability is achieved by the fact that cutting of the material 1 takes place when both frames 4, 5 are in the most favourable position with right angles formed between the kinetic pairs.

FIGURES 8 and 9 show sleeve and pillar arrangements to provide additional accurate location between the frames 4, 5. Pillars 55 are either positioned in the die holder or are clamped to the frame 5. Sleeves 56 are located either in the punch holder or are clamped to the frame 4. The engagement of a pillar 55 in a sleeve 56 is of a small order, being about two inches. The co-operating surfaces of the pillar and sleeve are conical so that as the pillar commences to enter the sleeve there is a clearance therebetween and at the point of cutting of tools 2, 3 the clearance is zero thus preventing any variation in the normal working gap between the tools.

FIGURE 10 illustrates the dynamic balancing of the crank driving mechanism for frames 4, 5. To achieve complete balancing the crank pin axis C1 and the centre of gravity of the balance weight 14 are at a distance R from the axis of one crank shaft (10, FIG. 1). The crank pin axis C2 is also at a distance R from the axis of the other crank shaft (11, FIG. 11). Thus the centrifugal force FC1 is equal to RC1 and FC2 is equal to RC2 and complete balance is achieved within the assemblies of the frames 4, 5 and the crank shaft assemblies therefor.

Means is provided to keep a constant ratio between the length of sheet 44 and the crank length R and the principle of this adjustment is illustrated in FIGURE 11. Adjustment of the crank length is achieved by rotation of an adjusting gear 57 which is keyed to an adjustment shaft 58 extending through the crank shaft 10. The shaft 58 drives a bevel gear 59 mating with another bevel gear 60 keyed to an adjusting screw 61. The adjusting screw 61 has a right-hand thread 62 cut on the crank pin side and a left-hand thread 63 cut on the balance weight side and thread 62 is screwed into a nut 64 while thread 63 is screwed into a nut 65. The nut 64 is located in the crank pin 66 and nut 65 is located in the balance weight 14. The correct crank length R is achieved by pre-loading the crank pin 66 against a gauge piece 67. The crank length adjusting arrangement is applied to each of the crank shafts 10, 11, 12, 13 and in the following description the adjusting arrangement for each of the cranks will be referred to by like reference numerals. The adjusting gears 57 are intergeared and operated by a handwheel as described below. Pre-loading against the gauge piece 67 introduces winding on the shafts 58 with the tendency to drive the gears 57 in opposite directions to the driving gears 16, 17, 18, 19 and so provide an anti-backlash arrangement which is beneficial at high speeds.

FIGURE 12 illustrates diagrammatically the arrangement of driving means for the apparatus and also mechanism which permits adjustment of the length of the crank arms 6, 7; 8, 9 and transfers a pre-load to the gear trains to satisfy anti-backlash requirements which are essential to high operating speeds. In FIGURE 12 the tool-carrying frames 4, 5 are, for simplicity, shown in broken lines.

The rotary movement of the tool-carrying frames 4, 5 is imparted by trains of gears at each of the opposite sides of the frames, the gears being driven from the motor 34. To permit starting and accelerating under maximum torque requirements, a pony motor 68 is coupled to the gear 35 through a reduction unit 69 and an over-running clutch 70. The gear 37 is located centrally of shaft 38 thus ensuring substantially equal torsional deflections of the shaft 38 on both sides of the gear 37 during acceleration, cutting, and deceleration and so avoids detrimental over-straining of the moving parts and bearings.

Primary driving gears 71, 72 are keyed to the ends of the shaft 38 and mesh with driving gears 73, 74 keyed to an idler tubular shaft 75. At this stage there is a further reduction of speed, the driving gears 73, 74 meshing with and driving the driven gears 16. Although, as shown in FIGURE 12, only the crank shaft 10 is geared to crank shaft 11 through the idler gear 18 and the gear 17, this is sufficient to drive the frame 4 at three points, that is between gears 16, 17 and 18 at one end and between gears 16 and 18 at the other end, in order to carry the frame through the dead centres when the axes of the crank pins 66 and the axes of the crank shafts 10, 11 lie in one line. The drive is continued from gears 16 through the idlers 18, 21 to gears 19 which are keyed to the crank shafts 12 which together with the crank shafts 13 support the frame 5. Only one of the crank shafts 12 is provided with a driven gear 20 meshing with one of the idler gears 21 but this ensures that the frame 5 is driven at three points, that is between gears 19, 20 and 21 at one end and between gears 19 and 21 at the other end, in order to carry the frame 5 through the dead centres when the axes of the crank shafts 12, 13 and the axes of the crank pins 66 lie in one line.

With the position of the parts as shown in FIGURE 12, the crank length adjustment is performed by rotation of a handwheel 76, FIGURE 3, secured to a rotatable adjusting member shown as a shaft 77, FIGURES 3 and 12. In this position, the gear 21 is locked to the machine frame preventing rotation of driving gear 73, shaft 38, and gear 37 and also of the crankshaft assemblies. Turning of the handwheel 76 causes rotation of eccentric differential gears 78, 79 with reduced speed and the gear 78 rotates a gear 80 which, in turn, rotates a transfer gear 81 rotatable with a torsion shaft 82 secured at 83, as by a pin, to a shaft 84. The gear 79 rotates a locking gear 79a which in turn locks the driving gear 73 against the primary driving gear 71. The shafts 82, 84 extend through the tubular idler shaft 75. Gears 85, 86 are keyed to the shaft 84 and mesh with the adjusting gears 57 attached to the shafts 58 which extend through the crank shaft 11 as described with reference to FIGURE 11. Idler gears 87, 88 connect the adjusting gears 57 connected with the shafts 58 in the crank shafts 11 with the adjusting gears 57 keyed to the shafts 58 which extend through the crank shafts 13. When the adjusting shaft 77 is rotated clockwise, as viewed in FIGURE 12, by rotation of the handwheel 76 the bevel gears 59, 60 cooperating with the cranks rotate the screws 61 so that the radii of the crank pins 66 is adjusted and increased relative to the axes of the crank shafts until the crank pins 66 engage the gauge pieces 67 as described above with reference to FIGURE 11.

It is possible to exercise a certain amount of torsional pre-load on the handwheel shaft 76 and this pre-load can be retained by locking the gear 81 to gear 73 through a clutch 90. The direction of the torsional pre-load is opposite to the direction of rotation of the apparatus. Due to torsional pre-loading the shaft 82 is subjected to the torsional strain as well as the tubular idler shaft 83 which is accordingly deformed by equal amounts on both sides of its centre.

The gears 57 can be adjusted relatively to shafts 58 so that the shafts 58 are equally strained in torsion. The reaction to this tension is provided by the train of gears 73, 16, 18, 21, 19 on one side of the apparatus and by the train of gears 74, 16, 18, 21, 19 on the opposite side of the apparatus. In this manner the crank length adjusting mechanism is also used to provide the anti-backlash mechanism.

The crank lengths of the crank shafts 10, 12 are automatically changed at the same time as that of the crank shafts 11, 13. Adjustment of the crank length is effected when the cranks 6, 7 occupy the dead centre positions thereof, as shown in FIGURE 12, in which positions the cranks are in line with the frame 4. When the length of crank 6 is changed, the change is transferred through the stiffness of frame 4 to the crank 7 which is provided with a quick-start screw arrangement to shift the balance weight at the same time to a corrected radius which is additionally determined by gauge pieces, not shown, similar to that of 67.

Locking means, not shown, are provided to secure the crank pins 66 to the crank arms.

The gears 18 and 87 are located in a holder 91, FIGURE 5, and the gears 21 and 88 are located in a holder 92.

The gears at the opposite ends of the apparatus are enclosed by covers 93, 94, FIGURE 3, and the cover 93 has an opening through which the adjusting shaft 77 protrudes to receive the handwheel 76.

The top casting 27 and the base casting 26 are clamped together by tie bolts 95, FIGURE 3, secured into nuts 96 in the base of the machine. Nuts 97 in the top casting 27 compress conical washers 98 in order to provide a controlled clamping force. The belt 40 is driven by driving wheels, 99, 100, 101.

FIGURE 13 illustrates stripper means arranged to be in contact with the material 1 while the tools 2, 3 are being moved apart after processing the material. The stripper means comprises a bar 102 carried by brackets 103 which support follower rollers 104 co-operating with eccentrics 105 rotatable with the crank shafts 11, FIG. 1, the amount of eccentricity being indicated at $e$, FIGURE 13. The brackets 103 are also supported by links 106 pivoted at 107 to the brackets and at 108 to the tool-carrying frame 4. The eccentrics 105 maintaining the bar 102 engaged with the material 1 while the tools 2, 3 are moved away from the material and then withdraw the bar from the material when the leading edge of the material clears the gap in the material control table 31, the gap being determined by the path of the tools 2, 3.

We claim:

1. Apparatus for processing material being advanced along a predetermined path at a predetermined linear velocity, comprising first and second tool-carrying frames respectively supporting first and second processing tools for co-operation one with the other and for movement into and out of engagement with opposite sides of material passing therebetween, pairs of intergeared adjustable throw cranks connected one pair to each end of each tool-carrying frame with the cranks of each pair mounted on opposite sides of a frame, driving means co-operating with each of the cranks and operable to rotate the pairs of cranks for the first and second frames in contra directions to maintain the processing tools in parallel relation throughout the movements of the tools into and out of co-operation with each other, means operable to adjust the throw of said cranks so that the tools move at substantially the linear speed of the material and in the direction of movement thereof during processing of the material by the tools.

2. Apparatus according to claim 1, wherein the driving means comprises two gear trains one each for the cranks on the opposite sides of the frames, each of said gear trains including driven gears rotatable with the shafts of the cranks, a pair of idler gears meshing one with the other and respectively meshing one with the driven gears for the first frame and one with the driven gears for the second frame, and driving gears meshing with one driven gear for one of the frames.

3. Apparatus for processing material being advanced along a predetermined path at a predetermined linear velocity, comprising first and second tool-carrying frames respectively supporting first and second processing tools for cooperation one with the other and movement into and out of engagement with opposite sides of material passing therebetween, pairs of intergeared cranks connecting one pair to each end of each tool-carrying frame with the cranks of each pair mounted on opposite sides of a frame, and driving means cooperating with the cranks and operable to rotate the pairs of cranks for the first and second frames in contradirections to maintain the processing tools in parallel relation throughout the movement of the tools into and out of cooperation with each other and to move the tools at substantially the linear speed of the material and in the direction of movement thereof during processing of the material by the tools, said driving means comprising two gear trains one each for the cranks on the opposite sides of the frames, each of said gear trains including driven gears rotatable with the shafts of the cranks, a pair of idler gears meshing one with the other and respectively meshing one with the driven gears for the first frame and one with the driven gears for the second frame, driving gears meshing with one driven gear for one of the frames, each crank comprising a hollow crank shaft housing a rotatable adjustment shaft co-axial therewith, and a crank pin including a nut screwed on to an adjusting screw the axis of which is at right angles to the axis of the crank shaft, a bevel gear rotatable with the adjusting screw and meshing with a second bevel gear rotatable with the adjustment shaft, and adjusting mechanism cooperating with the adjustment shaft to effect rotation thereof.

4. Apparatus according to claim 3, including gauge pieces locatable relative to the crank pins to determine the extent of movement of the crank pins away from the axes of the crank shafts.

5. Apparatus according to claim 3, wherein the adjustment shafts for the cranks of one pair for one frame each have an adjusting gear rotatable therewith and wherein idler gears connect the adjusting gears with adjusting gears rotatable with the adjusting shafts for the cranks of one pair for the other of the frames.

6. Apparatus according to claim 4, wherein the adjustment shafts for the cranks of one pair for one frame each have an adjusting gear rotatable therewith and wherein idler gears connect the adjusting gears with adjusting gears rotatable with the adjusting shafts for the cranks of one pair for the other of the frames.

7. Apparatus according to claim 5, wherein the adjusting mechanism comprises a rotatable adjusting member, eccentric differential gears rotatable with said member, and at one side of the frames an intermediate gear and a locking gear rotatable by the eccentric differential gears and co-operating respectively with one of the driving gears and with a transfer gear co-axial and rotatable with a primary adjusting gear co-operating with one of said adjusting gears.

8. Apparatus according to claim 7, including an idler tubular shaft with which the driving gears are rotatable, a hollow shaft extending axially through the tubular shaft, a torsion shaft co-axial with and extending through said hollow shaft and pinned to the hollow shaft at a position central between the ends thereof, said transfer gear being rotatable with the torsion shaft, and coupling means operable to couple the torsion shaft to the idler tubular shaft for rotation therewith.

9. Apparatus according to claim 8, wherein the coupling means comprises a clutch operable to couple one driving gear to the transfer gear, and including primary driving gears meshing with said driving gears, and a prime mover operable to effect rotation of the primary driving gears.

10. Apparatus according to claim 1, including for each frame balance weights so disposed relative thereto that the centre of gravity of the frame and the axes of the crank pins of the cranks for the frame are on opposite sides of the axes of the crank shafts of the cranks and are equi-distant therefrom.

11. Apparatus according to claim 10, wherein each frame is of lattice construction and the centre of gravity of each frame assembly is located on a straight line passing through the axes of the crank pins.

12. Apparatus according to claim 5, including for each frame balance weights so disposed relative thereto that the centre of gravity of the frame and the axes of the crank pins of the cranks for the frame are on opposite sides of the axes of the crank shafts of the cranks and are equi-distant therefrom.

13. Apparatus according to claim 12, wherein each frame is of lattice construction and the centre of gravity of each frame assembly is located on a straight line passing through the axes of the crank pins.

14. Apparatus according to claim 9, including for each frame balance weights so disposed relative thereto that the centre of gravity of the frame and the axes of the crank pins of the cranks for the frame are on opposite sides of the axes of the crank shafts of the cranks and are equi-distant therefrom.

15. Apparatus according to claim 14, wherein each frame is of lattice construction and the centre of gravity of each frame assembly is located on a straight line passing through the axes of the crank pins.

16. Apparatus for processing material being advanced along a predetermined path and predetermined linear velocity, comprising first and second tool-carrying frames for respectively supporting first and second processing tools for cooperation one with the other and for movement into and out of engagement with opposite sides of material passing therebetween, pairs of intergeared cranks connected one pair to each tool-carrying frame with the cranks of each pair mounted on opposite sides of a frame, and driving means cooperating with the cranks and operable to rotate the pairs of cranks for the first and second frames in contradirections to maintain the processing tools in parallel relation throughout the movements of the tools into and out of cooperation with each other and to move the tools at substantially the linear speed of the material and in the direction of the movement thereof during processing of the material by the tools, a stop rigidly mounted on one of the frames at a position downstream of the tool carried thereby, said stop being interposable by the frame in the path of the leading edge of the material to be processed thereby accurately to locate the material relatively to the tools and to be movable by the frame out of the path of the material as the tools are disengaged therefrom.

17. Apparatus according to claim 16, including clamps resiliently mounted on the frames for movement therewith said clamps being located between the tools and skid stops and operable to prevent rippling of the material between the tools and the stop.

18. Apparatus according to claim 5, including a stop rigidly mounted on one of the frames at a position downstream of the tool carried thereby, said stop being interposable by the frame in the path of the leading edge of the material to be processed thereby accurately to locate the material relatively to the tools and to be movable by the frame out of the path of the material as the tools are disengaged therefrom.

19. Apparatus according to claim 18, including clamps resiliently mounted on the frames for movement therewith said clamps being located between the tools and skid stops and operable to prevent rippling of the material between the tools and the stop.

20. Apparatus according to claim 9, including a stop rigidly mounted on one of the frames at a position downstream of the tool carried thereby, said stop being interposable by the frame in the path of the leading edge of the material to be processed thereby accurately to locate the material relatively to the tools and to be movable by the frame out of the path of the material as the tools are disengaged therefrom.

21. Apparatus according to claim 20, including clamps resiliently mounted on the frames for movement therewith said clamps being located between the tools and skid stops and operable to prevent rippling of the material between the tools and the stop.

22. Apparatus according to claim 1, including tapered pillars carried by one of the frames, and internally tapered sleeves carried by the other of the frames, said pillars and sleeves being opposed one with another and arranged to effect accurate location of the frames one with the other.

23. Apparatus according to claim 5, including tapered pillars carried by one of the frames, and internally tapered sleeves carried by the other of the frames, said pillars and sleeves being opposed one with another and arranged to effect accurate location of the frames one with the other.

24. Apparatus according to claim 9, including tapered pillars carried by one of the frames, and internally tapered sleeves carried by the other of the frames, said pillars and sleeves being opposed one with another and arranged to effect accurate location of the frames one with the other.

25. Apparatus according to claim 17, including tapered pillars carried by one of the frames, and internally tapered sleeves carried by the other of the frames, said pillars and sleeves being opposed one with another and arranged to effect accurate location of the frames one with the other.

26. Apparatus according to claim 19, including tapered pillars carried by one of the frames, and internally tapered sleeves carried by the other of the frames, said pillars and sleeves being opposed one with another and arranged to effect accurate location of the frames one with the other.

27. Apparatus according to claim 21, including tapered pillars carried by one of the frames, and internally tapered sleeves carried by the other of the frames, said pillars and sleeves being opposed one with another and arranged to effect accurate location of the frames one with the other.

28. Apparatus according to claim 1, in which the tools are operable in a gap provided in a material control table and including stripper means operable to engage the material while the tools are disengaged therefrom and until the leading edge of the material crosses said gap.

29. Apparatus for processing material being advanced along a predetermined path and predetermined linear velocity, comprising first and second tool-carrying frames for respectively supporting first and second processing tools for cooperation one with the other and for movement into and out of engagement with opposite sides of material passing therebetween, pairs of intergeared cranks connecting one pair to each end of each tool-carrying frame with the cranks of each pair mounted on opposite sides of a frame, and driving means cooperating with the cranks and operable to rotate the pairs of cranks for the first and second frames in contradirections to maintain the processing tools in parallel relation throughout the movements of the tools into and out of cooperation with each other and to move the tools in substantially the linear speed of the material and in the direction of movement thereof during processing of the material by the tools, said tools being operable in a gap provided in a material control table and including stripper means operable to engage the material while the tools are disengaged therefrom and until the leading edge of the material crosses said gap, said stripper means comprising a bar carried by brackets supported by eccentrics rotatable with those crank shafts of cranks for the first tool-carrying frame and which are at the end of the frame remote from the tool carried thereby, and links pivotally connected to the brackets and the first tool-carrying frame.

References Cited

UNITED STATES PATENTS

| 2,406,808 | 9/1946 | Conner | 83—328 X |
| 2,440,848 | 5/1948 | Conner | 83—328 |
| 2,855,998 | 10/1958 | Einhiple | 83—327 |
| 3,269,245 | 8/1966 | Elineau | 83—328 X |

FOREIGN PATENTS 903,883   2/1954   Germany.

ANDREW R. JUHASZ, *Primary Examiner.*